United States Patent Office 3,305,026
Patented Feb. 21, 1967

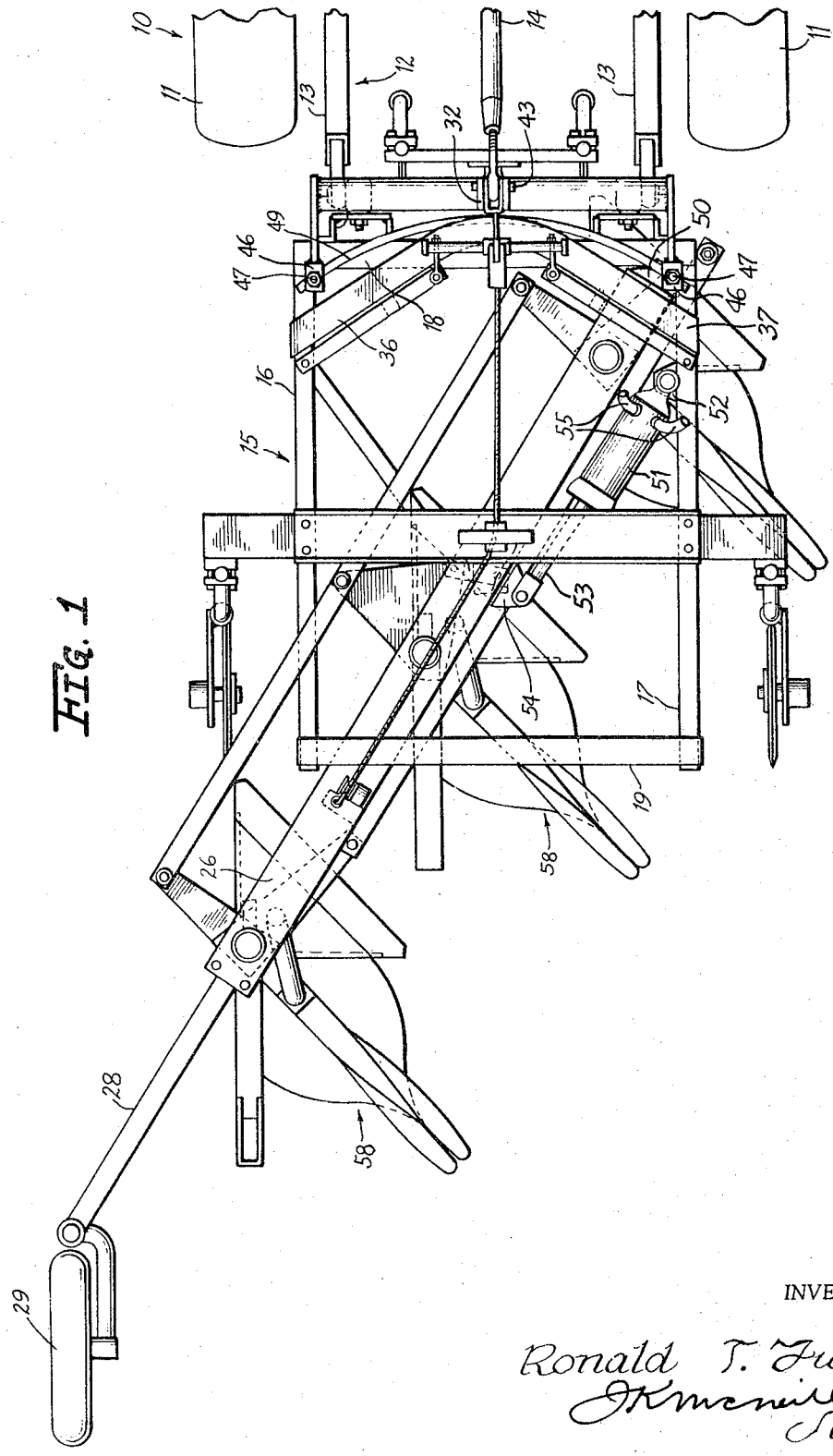

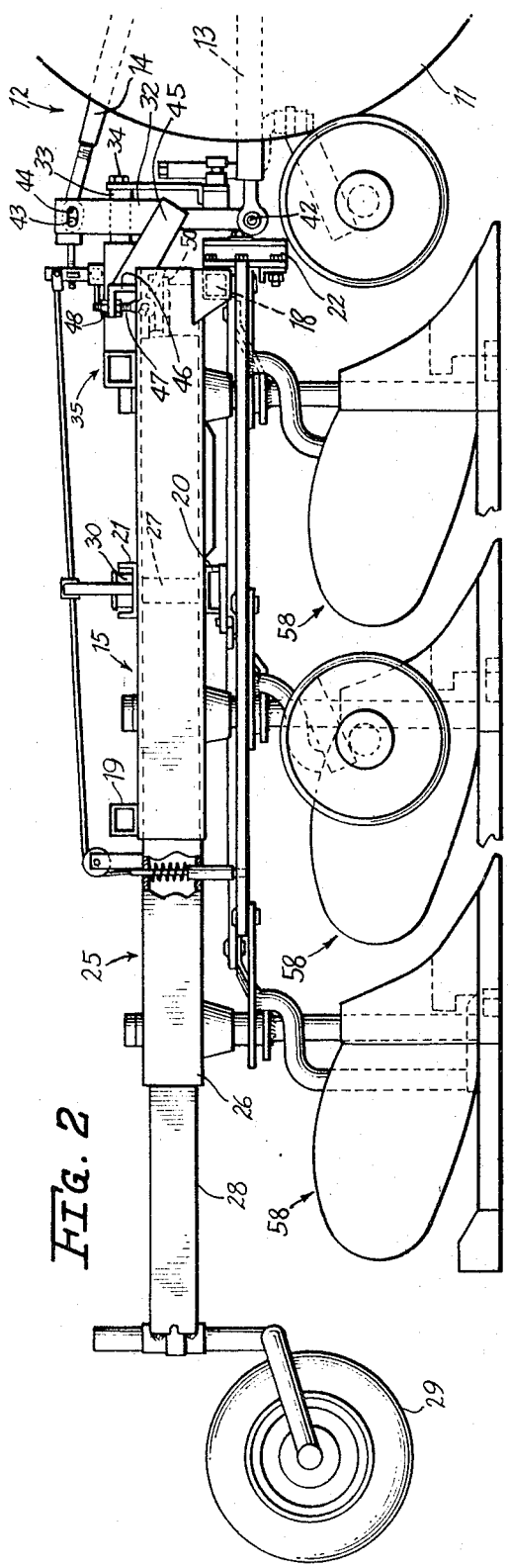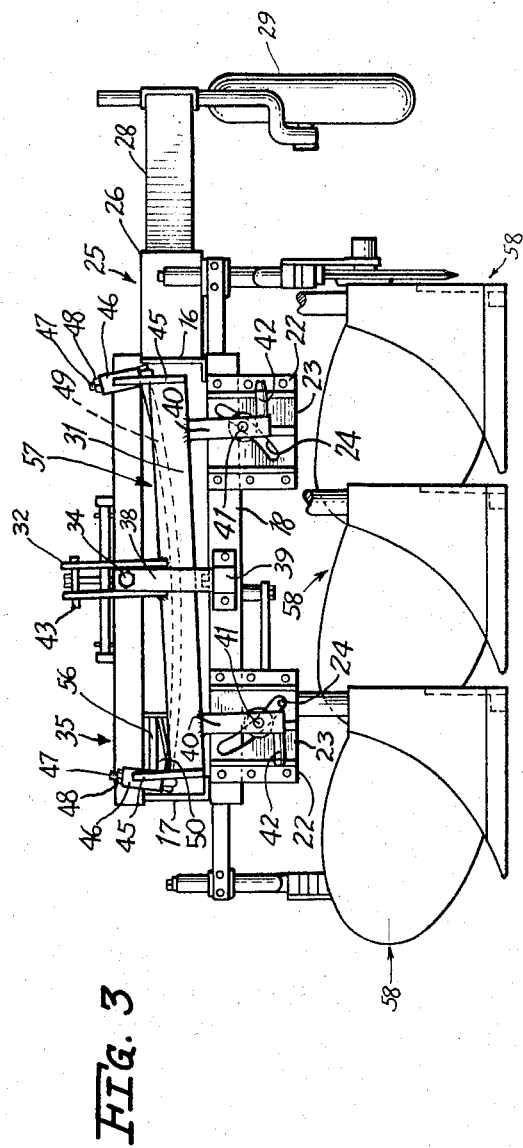

3,305,026
LEVELING APPARATUS FOR TWO-WAY PLOW
Ronald T. Fulton, Tinley Park, Ill., assignor to International Harvester Company, a corporation of Delaware
Filed May 28, 1964, Ser. No. 371,064
7 Claims. (Cl. 172—222)

This invention relates to agricultural implements and particularly to reversible or two-way plows. More specifically, the invention concerns leveling means for a two-way plow.

Reversible plows customarily include a supporting frame upon which is mounted an auxiliary frame carrying right and left-hand plow units and shiftable relative to the main supporting frame to alternately dispose the plow units in positions for right and left-hand plowing. It is customary to integrally connect such a plow to a tractor which has laterally spaced drive wheels and is tiltable to alternately dispose one of the wheels in the furrow made by the operating plow unit. It is important that the plow remain level while the tractor is tilted, and the object of this invention is the provision of a two-way or reversible plow of improved construction having novel means for controlling the operating position thereof.

Another object of the invention is the provision of novel leveling means for a tractor-mounted two-way plow.

Another object of the invention is the provision, in a reversible plow of the type having a hitch frame and a tool-carrying frame swingable laterally to alternately dispose right and left-hand plow units in plowing position, of means actuated by the lateral swing of the tool-carrying frame to laterally tilt it relative to the hitch frame to maintain the tool-carrying frame level.

Other objects and advantages of the invention will become clear from the following detailed description when read in conjunction with the accompanying drawings wherein:

FIGURE 1 is a plan view of the rear end of a tractor having mounted thereon an implement embodying the features of this invention;

FIGURE 2 is a view in side elevation of the structure shown in FIGURE 1; and

FIGURE 3 is a front elevation of the implement of this invention, with parts removed, disconnected from the tractor.

The implement with which this invention is concerned is a tractor-mounted two-way plow, many of the constructional details of which form no part of the present invention, and for such constructional details reference may be had to copending U.S. application Serial No. 318,279, filed October 23, 1963.

In the drawings the implement with which this invention is concerned is shown connected to a tractor 10 having laterally spaced rear drive wheels 11 and a power-lifted draw frame 12 of the three-point type comprising a lower pair of laterally spaced links 13 pivotally connected in a well-known manner, not shown, to the tractor and raised and lowered by conventional power means, also not shown, carried by the tractor. The tractor hitch structure or draw frame 12 also includes an upper forwardly and downwardly directed link 14 also pivotally connected to the tractor.

The reversible plow of this invention includes a rectangular plow carrying main frame 15 having channel-shaped side plates 16 and 17 connected at their forward ends by a crossbar 18 secured to the base of the plates, and a rear crossbar 19 affixed to the top of plates 16 and 17. Between bars 18 and 19, channel-shaped braces 20 and 21 are affixed to the bottom and top, respectively, of side plates 16 and 17.

Laterally spaced pairs of angle bars 22 are affixed to and depend from forward bar 18 of the main frame, and each pair of angle bars is connected by a plate 23 having an arcuately shaped diagonal slot 24 formed therein.

Main frame 15 includes an auxiliary tool-carrying frame 25 which comprises an elongated horizontal beam 26, rectangular in section, pivotally mounted medially of its ends upon a vertical pivot pin 27 carried by the channel-shaped brace members 20 and 21. A beam extension 28 is provided carrying a gauge wheel 29.

The pivot pin or bolt 27 is provided with a cap 30 and constitutes a vertical axis for the lateral swinging of the tool-carrying beam 26 to opposite diagonal positions relative to the direction of travel of the tractor and implement to positions corresponding to right and left-hand plowing, the right-hand plowing position being indicated in the drawings. The tool-carrying frame 25 is swingable about the axis of pin 27 to the opposite diagonal for left-hand plowing. This lateral shifting or swinging of the implement from one operating position to another is guided by a combination guide and leveling apparatus comprising a transversely extending tubular member 31 having a pair of uprights 32 affixed centrally thereof and having a sleeve 33 secured therebetween and adapted to receive a pivot bolt 34, one end of which is affixed to an arch-shaped bar 35, square in cross section, having rearwardly diverging arms 36 and 37, the rear ends of which are secured to side plates 16 and 17.

The tubular member 31 is pivotally suspended upon the forward end of pivot bolt 34 by means of a bracket 38, the lower end of which is mounted upon a bar 39 affixed to cross-bar 18. Thus, member 31 is capable of swinging in a vertical plane about the axis of the pivot bolt 34 between plow-leveling positions corresponding to right and left-hand plowing.

Laterally spaced legs 40 are affixed to and depend from tubular member 31 and are provided with pins 41 slidably receivable in the respective slots 24 in plates 23. Also affixed to legs 40 and projecting laterally therefrom are pegs 42 to which the rear ends of lower tractor hitch links 13 are pivotally connected. Pins 41 are confined in slots 24, the curvature of each of which is on an arc about the axis of pivot bolt 34. The spaced arms of bracket 32 carry therebetween a pivot pin 43 which is connected to the rear end of upper hitch link 14, pin 43 being received in a slot 44 as shown in FIGURE 2, for a purpose which forms no part of this invention, and for an explanation of which reference may be had to the aforesaid co-pending U.S. application.

Upwardly and rearwardly extending plates 45 are affixed to the ends of transverse tubular member 31 and have secured to the ends thereof angle brackets 46, each of which is apertured to adjustably receive a threaded eye bolt 47 secured to the angle bracket by nuts 48 for vertical adjustment relative thereto. The ends of an arcuately shaped camming rod 49 are received in the eyes of bolt 47, and a clevis 50 affixed to and projecting from the forward end of beam 26 straddles rod 49. Thus, in order to maintain the implement level during operation, as indicated for right-hand plowing in FIGURE 3, with the right-hand tractor drive wheel in the furrow, the implement is carried on the tractor through the tubular member 31 with bracket 32 and lower link attaching pin 42. With the tractor leaning into the furrow, tube 31 assumes an angular position such as indicated in FIGURE 3 relative to the implement frame, the implement main and tool-carrying frames remaining substantially parallel to the ground.

The implement is vertically moved between operating and transport positions by raising and lowering the tractor draw frame 12, the latter being accomplished by any suitable power operated lifting apparatus, not shown, carried by the tractor. Lateral shifting of the tool-carrying auxiliary frame 25 is accomplished by the provision of a hydraulic cylinder 51 anchored to a leg 52 projecting inwardly from side rail 17 of the main frame 15 and having a piston rod 53 slidable therein pivotally connected to a lug 54 secured to the side of beam 26.

In FIGURE 1 the tool-carrying frame 25 is shown in the right-hand operating position of the implement with the piston rod 53 extended. Fluid under pressure is supplied to the cylinder 51 through hose lines 55 from any suitable source of fluid under pressure, not shown, such as may be carried on the tractor. Upon retraction of the piston rod in the cylinder the tool-carrying frame 25 swings laterally about the axis of pivot pin 27 to the left-hand plowing position with the tool-carrying frame 25 on the opposite diagonal from that shown in FIGURE 1, whereupon tubular member 31 swings from the position shown in FIGURE 3 about the axis of pivot bolt 34, guided by pins 41 in slots 24, clockwise to compensate for the left-hand tractor drive wheen leaning into the furrow. The plow frame is thus maintained level at all times. Rod 49 is pivotally secured medially of its ends to pipe 31 and constitutes a track received within the clevis 50 and serving to guide and to control the swinging of the beam and the extent of leveling of the plow frame or the turning of tubular member 31 about the horizontal axis 34. Leveling adjustment is achieved by loosening nuts 48 and manipulating eye bolt 47 to exert pressure against one end of rod 49, such adjustment serving to regulate the relationship between bar 49 and tubular member 31, the oscillation of tubular member 31 being effected by the sliding of clevis 50 thereover from one end to the other. To the top of beam 26 is affixed a wear plate 56 engaging the undersurface of arched brace member 35 and extending rearwardly therefrom.

By adjusting bolts 47, the ends of rod 49 are bent and more or less tension placed thereon. The positions of the ends of the rod 49 relative tubular member 31, by engagement in clevis 50 at the forward end of beam 26 which swings laterally from one end of the bar 49 to the other in reversing the plowing position, determine the amount of lateral tilting or rotation of the main and tool-carrying frames.

The lateral tilting of the main and tool-carrying frames occurs in relationship to the implement hitch structure generally designated by the numeral 57 and accommodates more or less relative angular movement between the main and tool-carrying frames and the implement hitch frame 57, depending upon the depth of operation of the plow units designated 58, such operating depth being regulated by adjustment of gauge wheel 29 and tractor draw frame 12.

It should be understood that the details of construction of the earthworking units 58 and the manner in which they are mounted on the auxiliary frame 25 form no part of this invention, and for a description thereof reference may be made to the copending U.S. application referred to hereinbefore.

It is believed that the novel leveling apparatus for the two-way plow of this invention should be clearly understood from the foregoing description. It should likewise be understood that the invention has been described in its preferred embodiment only and that modifications may be made therein without departing from the spirit of the invention or the scope of the appended claims.

What is claimed is:

1. A two-way plow for use in combination with a tractor having laterally spaced rear wheels and a draw frame tiltable with the tractor when one of said wheels is disposed in a furrow comprising a relatively stationary main frame, a hitch frame attachable to the tractor draw frame for tilting therewith and with the tractor, generally horizontal pivot means connecting said main frame to said hitch frame to accommodate relative angular movement between the main frame and the hitch frame in response to said tilting of the tractor to automatically maintain said main frame level, an auxiliary frame having plow units thereon adapted for right and left-hand plowing, means mounting said auxiliary frame on said main frame for swinging movement relative thereto to alternately dispose said plow units in position for right and left-hand plowing, and means operatively connecting the forward end of said auxiliary frame and said hitch frame to control the angular movement of said main and auxiliary frames relative to said hitch frame.

2. The invention set forth in claim 1, wherein said auxiliary frame is mounted on said main frame for lateral swinging about a generally vertical axis to opposite diagonals with respect to the direction of travel for alternate right and left-hand plowing and said hitch frame includes a transversely extending rigid member connected at laterally spaced locations to said draw frame and a transversely extending guide track carried by said rigid member and operatively connected to said auxiliary frame to rotate the latter and said main frame about the axis of said horizontal pivot means during lateral swinging of the auxiliary frame from one operating position to the other.

3. The invention set forth in claim 2, wherein said guide track is a cam member connected centrally thereof to said rigid member and arcuately shaped in a vertical plane.

4. The invention set forth in claim 3, wherein said cam member is a flexible rod the ends of which are secured to said rigid member by adjustable means for adjusting the vertical position of one end of the rod relative to the other and to said horizontal pivot means to vary the angular displacement of said main frame relative to said hitch frame upon lateral swinging of the auxiliary frame from one operating position to the other.

5. A reversible plow adapted to be mounted for transport upon a wheeled tractor tiltable laterally to dispose one of the tractor wheels in a furrow formed by the plow and having a draw frame vertically movable with respect to and tiltable with the tractor, said plow comprising a hitch frame including a transversely extending rigid member having means thereon for connection at laterally spaced locations to said draw frame for lateral tilting with the tractor, a main supporting frame having a plow-carrying frame thereon laterally swingable relative thereto between positions for right and left-hand plowing, means pivotally connecting said main supporting frame to said hitch frame for lateral tilting relative thereto and to the tractor about a central longitudinal axis when said plow-carrying frame is swung laterally from one of its operating positions to the other, and means operatively connecting said plow-carrying frame to said hitch frame and effective throughout the range of lateral swinging of the plow-carrying frame to control said tilting of said main supporting frame.

6. The invention set forth in claim 5, wherein said last mentioned connecting means is a transversely extending tension rod connected at its central portion and at its ends to said rigid member, means are provided in the connection of said rod ends to rigid member to adjust the ends vertically and a slide and guide connection is provided between the forward end of said plow-carrying frame and said rod.

7. The invention set forth in claim 6, wherein said rod has its ends vertically displaced from the connection of its central portion to said rigid member causing said ends to exert a force in cooperation with said plow-carrying frame to rotate the latter and the main supporting frame about the pivotal connection of the latter to said hitch frame.

References Cited by the Examiner

UNITED STATES PATENTS

| 718,831 | 1/1903 | Ehler | 172—219 |
| 2,591,711 | 4/1952 | Moore | 172—219 X |
| 2,656,776 | 10/1953 | Cox et al. | 172—459 |
| 2,818,007 | 12/1957 | Silver et al. | 172—222 X |
| 2,982,362 | 5/1961 | Thompson | 172—210 |

FOREIGN PATENTS 1,016,941  9/1952  France.

ABRAHAM G. STONE, *Primary Examiner.*

R. L. HOLLISTER, *Assistant Examiner.*